3,349,118
PRODUCTION OF ETHYLENE GLYCOL ACETATES

Charles F. Kohll and Taeke Jonkhoff, Amsterdam, Netherlands, assignors to Shell Oil Company, New York, N.Y., a corporation of Delaware
No Drawing. Filed Nov. 13, 1964, Ser. No. 411,110
Claims priority, application Netherlands, Dec. 9, 1963, 301,519
1 Claim. (Cl. 260—497)

This invention relates to a process for the production of glycol esters of carboxylic acids. It relates more particularly to the production of 1,2-hydrocarbylene esters of monocarboxylic alkanoic acids by reacting under certain conditions ethylenically unsaturated hydrocarbons with palladium salts in the presence of nitric acid and monocarboxylic alkanoic acid.

The reaction of an olefin such as ethylene with a carboxylic acid under certain conditions is known to produce unsaturated esters, e.g., vinyl esters. One such process is described in French Patent 1,308,723, which issued Nov. 9, 1962, wherein contacting ethylene with a solution containing a carboxylic acid, e.g. acetic acid, an ionizable carboxylate and palladium chloride in the presence of a redox system and molecular oxygen produced vinyl acetate as a major product and also a very small quantity of ethylene glycol diacetate. The present invention is concerned with providing a process wherein glycol esters of carboxylic acids, and preferably glycol dicarboxylates, are produced as the desired product in favorable yield.

In accordance with the invention glycol esters of carboxylic acids, and more particularly, 1,2-hydrocarbylene esters of monocarboxylic alkanoic acids, are obtained by treating ethylenically unsaturated hydrocarbons with nitric acid and a palladium salt in a substantially anhydrous liquid medium containing monocarboxylic alkanoic acid. A critical feature of the invention is the proviso that the molar ratio of nitric acid to palladium salt must be greater than 0.5 and preferably 0.8 and greater. When the aforesaid molar ratio is less than 0.5, the desired esters are not obtained in any appreciable quantity and, instead, carbonyl compounds, e.g. aldehydes or ketones, and alkenyl esters, e.g. vinyl esters, are the major products depending upon the reaction media. On the other hand, molar ratios even much larger than 0.8 can be used if it is desired to have present greater quantities of nitric acid; for example, molar ratios of nitric acid to palladium salt of 5 to 200 may be chosen and, of course such choice will be governed by economic considerations.

Another way in which the glycol esters of carboxylic acids produced by the process of the invention can be described is by the term, monocarboxylic alkanoic acid esters of 1,2-ethanediols of the formula

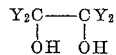

wherein each Y is individually selected from hydrogen and hydrocarbyl and two Y's on vicinal C-atoms may be joined into a hydrocarbylene radical.

The aforesaid 1,2-hydrocarbylene moiety of the ester or, alternatively, the aforesaid 1,2-ethanediol and hydrocarbyl-substituted 1,2-ethanediol moieties of the ester correspond to the olefinic hydrocarbon charged to the process. Ethylenically unsaturated hydrocarbons used as starting materials comprise the monoolefins, preferably alpha-olefins. The suitable olefinic hydrocarbon starting materials comprise, for example, the monoolefinic acyclic alkenes, such as ethylene, propylene, 1-butene, 2-butene, 1-pentene and 2-pentene; the polymeric olefins prepared by polymerization or copolymerization of ethylene and/or propylene; the olefins prepared by cracking paraffinic hydrocarbons such as, for example, paraffin waxes, high-boiling paraffinic fractions and residues obtained in the distillation of mineral oils and distillate fractions of cracking products of high-boiling petroleum fractions, etc.; cyclic olefins (cycloalkenes) such as cyclopentene, cyclohexene and the like; aralkenes such as styrene and the like. A particularly preferred starting material comprises ethylene and its lower homologs. Such a preferred group of alkenes of, for example, 2 to 5 carbon atoms yield in the process of the invention 1,2-hydrocarbylene esters, i.e. 1,2-alkylene esters, in which the glycol moiety of the ester is of 2 to 5 carbon atoms. Although monoolefinic hydrocarbons are preferred, also useful are hydrocarbons containing isolated multiple ethylenic double bonds such as non-conjugated diolefins, e.g., 1,5-hexadiene, 1,7-octadiene and 1,4-cyclohexadiene. Mixtures of the aforementioned hydrocarbons with each other may also be used if desired, e.g., ethylene and propylene mixtures.

The palladium salt used in the process of the invention may be a compound of palladium and an anion of any of a wide variety of acids such as carboxylic acids, hydrogen halides, sulfonic acids, thioalcohols, and oxidizing acids, e.g. nitric, sulfuric, peracetic and the like. Preferred are palladium chloride and the carboxylic acid salts of palladium. Carboxylic acid salts of palladium used in the present invention comprise broadly those derived from monocarboxylic acids and more particularly those derived from monocarboxylic acids of 2 to 19 carbon atoms. These suitable carboxylates include, for example, those derived from the aliphatic monocarboxylic acids, such as the acetates, propionates, butyrates, isobutyrates, palmitates, stearates, and the like; salts of tertiary acids in which the carboxylic group is directly linked to a tertiary or quaternary carbon atom, such as the benzoates and the tertiary alkanoates, e.g., trialkylacetates as the pivalates and the like; as well as mixtures thereof. Of these, palladium salts of the lower aliphatic monocarboxylic acids, such as the acetates, and salts of saturated aliphatic monocarboxylic acids having the carboxyl group directly linked to a tertiary or quaternary carbon atom are most preferred.

Reaction of the olefinic charge, nitric acid, and palladium salt in accordance with the present invention is carried out in a substantially anhydrous liquid medium. A water content in the liquid medium of up to 5 percent by weight of the liquid phase of the reaction mixture may be accommodated; however, it is preferred that the water content be not more than 3 percent by weight.

Suitable liquid reaction media are any of the carboxylic acids, or mixtures of the carboxylic acids, mentioned above as suitable for providing the anion of the palladium carboxylate reactant. The carboxylic acid employed as reaction medium need not necesarily be the same as that from which the palladium salt reactant is derived and in the case of palladium chloride, cannot be. Additionally other liquids may be used as well; for example, liquid sulfur dioxide, sulfolane, ketones such as acetone and 2-butanone, hydrocarbons such as isooctane, halogenated hydrocarbons, esters, e.g. alkyl esters such as ethyl acetate, amides such as dimethylformamide, nitriles such as acetonitrile, ethers such as 1,2-dimethoxyethane, tetrahydrofuran, etc., or mixtures of these liquids, and the like.

The reaction is preferably carried out at moderate temperatures since under these conditions side reactions are minimized. Preferably temperatures are applied which are in the range between about 0° and 150° C.; more preferably, in the range between about 20° and 120° C.

The pressure at which the gaseous reaction components may be passed into the reaction liquid can be varied between wide limits. Atmospheric, superatmospheric, and subatmospheric pressures may be employed. Pressures between about 0.1 and about 100 atmospheres are generally satisfactory. However, superatmospheric pressures are preferred, for instance between about 1 and about 100 atmospheres, and more preferably between about 1 and about 10 atmospheres. If desired, the gaseous olefins may be diluted with other gases, for example, nitrogen, oxygen, air, methane, ethane, and the like.

Optionally, for favorably affecting reaction rates, promoter compounds and mixtures thereof may be added to the reaction mixture. Such promoters include iron and copper carboxylates, nitrates, sulfates, and halides. These same salts of other metals, such as silver, zinc, cadmium, boron, aluminum, scandium, yttrium, the rare-earths—in particular cerium and the mixture known as didymium, manganese, nickel, and uranium, are also useful promoters. It is desirable, if not preferable, to use the metal carboxylate of the carboxylic acid used in the process, namely those monocarboxylic alkanoic acids referred to above. Another group of useful optional promoters, which may further increase the reaction rate, includes the halides of alkali and alkaline earth metals. Particularly preferred are lithium and sodium chloride. The optional promoters are usually added in amounts between about 0.1 and about 50% molar based on the molar amount of palladium salt used.

The palladium salts and the optional promoters, when used, may be added to the reaction mixture as such or they may be supported on inactive carriers, which are inert in the reaction medium, such as Carborundum. Also, active carriers can be employed with the additional advantage of further increasing the reaction rate. Alkaline carriers which have porous alkaline sites on or near the surface are useful. Others are molecular sieves, pumice, aluminas, and activated carbon with the molecular sieves being the more preferred.

During the course of the process the palladium component of the palladium salt reactant is reduced to a lower valency or to the metallic state. Owing to the presence of the nitric acid reagent, the reduced palladium is reoxidized in situ, either partially or completely. If the reoxidation is partial, complete regeneration may be performed in the same reactor or it may be carried out separately and, if desired, the regenerated material subsequently recirculated. Such a regeneration process is described in detail in copending application Ser. No. 377,049, filed June 22, 1964.

The aforesaid partial reoxidation in situ of the reduced palladium is concurrent, of course, with a corresponding reduction of the nitric acid. In order to maintain the earlier mentioned molar ratio of nitric acid to palladium salt at the preferred level of 0.8, it is desirable to begin with a large excess of nitric acid. Alternatively, additional liquid nitric acid may be added incrementally during the course of the process or gaseous nitrogen oxides may be supplied to the liqid reaction medium, each optionally accompanied by oxygen.

Under the hereinabove defined conditions, olefinic hydrocarbons will undergo reaction with palladium salts in carboxylic acid medium with the formation of reaction products comprising 1,2-hydrocarbylene esters wherein the acid moiety of the ester corresponds to the acid-derived portion of the palladium salt or, in the case of palladium salt being other than carboxylates, to the carboxylic acid in the liquid medium and the glycol moiety of the ester corresponds to the olefinic hydrocarbon charge. The majority product is a diester of the glycol and the minority product is a monoester of the glycol. The products can be conveniently and individually isolated by conventional techniques such as fractional distillation.

The process of the invention is used to prepare a large variety of glycol esters, which are valuable as plasticizers, solvents, and for many other purposes.

*Example I.—Molar ratio of $HNO_3$:Pd salt=2*

Into a mixture of 0.15 mol of palladium acetate, 0.3 mol of nitric acid and 5 mols of acetic acid, ethylene was introduced at 25° C. The rate at which the olefin was taken up by the mixture was very high at first, but decreased rapidly after ten minutes, at which time 0.175 mol of ethylene had been absorbed. Nitrous vapors were observed to have been emitted by the mixture. After 30 minutes the supply of ethylene to the reaction mixture was stopped.

After the recovery of acetic acid from the reaction mixture by distillation, glycol monoacetate in a yield of 6.48 grams (35.4% of theory) and glycol diacetate in a yield of 9.75 grams (38% of theory) were isolated, also by distillation. The theoretical yields are based upon absorbed ethylene.

In addition to the glycol esters, the reaction also produced 1.8 grams of by-product acetaldeyhde.

*Example II.—Molar ratio of $HNO_3$:Pd salt=2*

In a reaction vessel were placed 0.2 mol of palladium acetate, 0.4 mol of nitric acid, 0.028 mol of iron nitrate, 0.028 mol of lithium chloride and 6.67 mols of acetic acid. The temperature of the resulting mixture was raised to 50° C., after which ethylene was passed through for one hour.

The ethylene absorption proceeded very rapidly at first; after 20 minutes, however, the rate of absorption dropped considerably and a precipitate of metallic palladium formed gradually. Nitric oxide (NO) evolved from the mixture.

After the aforementioned period of one hour, the ethylene feed was discontinued. 0.366 mol of the olefin had then been absorbed. The reaction mixture was filtered to remove precipitated palladium and salts of other metals. Acetaldehyde, formed as a by-product, was removed by distillation. After the recovery of acetic acid from the filtrate, the residue was subjected to fractional distillation at reduced pressure, yielding a mixture of the mono- and diacetate of ethylene glycol, which contained glycol monoacetate in an amount corresponding to 28% of theoretical yield and glycol diacetate in an amount corresponding to 34.3% of theoretical yield—both yields based upon absorbed ethylene.

*Example III.—Molar ratio of $HNO_3$:Pd salt =1*

Into a mixture of 0.1 mol of palladium acetate, 0.1 mol of nitric acid, 0.014 mol of cupric acetate, 0.014 mol of didymium acetate and 0.014 mol of lithium chloride, a mixture of gases consisting of ethylene and oxygen was passed for 3½ hours at 95° C. The feed rates of ethylene and oxygen were 14.4 l./hr. and 41 l./hr., respectively. The nitric acid concentration in the reaction mixture was maintained by adding fresh acid to the mixture at a rate of 0.145 mol/hr. The average rate of ethylene absorption in the mixture was 0.40 mol/hr., so that, after 3½ hours, 1.4 mols of ethylene had been absorbed. After the reaction was complete, the desired product, glycol diacetate, was recovered by fractional distillation in a yield of 37.3% of theory, based upon absorbed ethylene. By-product acetaldehyde was also formed in a yield of 23.5% of theory.

*Example IV.—Molar ratio of $HNO_3$:Pd salt =0.1*

The experiment described in this example was conducted for comparison only and not according to the invention.

Under other wise similar conditions as described in Example III, the experiment was performed with 0.01 mol of nitric acid instead of 0.1 mol.

During the reaction 1.19 mols of ethylene was absorbed and the nitric acid concentration was maintained by adding thereof 0.05 mol/hr.

After the 3½-hour reaction period, it was found that the yield of glycol diacetate decreased to 7.7% of theory whereas the undesired acetaldehyde increased in yield to 26.7% of theory.

We claim as our invention:

The process of producing acetates of ethylene glycol by reacting ethylene, in a substantially anhydrous liquid medium of acetic acid containing a small amount of nitric acid, essentially with palladium acetate and nitric acid, the molar ratio of nitric acid to palladium acetate being at least 0.8, at a temperature between 20° and 120° C. and a pressure between 1 and 10 atmospheres.

References Cited

UNITED STATES PATENTS

| 3,260,739 | 7/1966 | Schaeffer | 260—497 |
| 3,262,969 | 7/1966 | Clark et al. | 260—497 |

FOREIGN PATENTS

| 608,610 | 3/1962 | Belgium. |
| 614,970 | 9/1962 | Belgium. |

LORRAINE A. WEINBERGER, *Primary Examiner.*

V. GARNER, *Assistant Examiner.*